United States Patent [19]
Lace

[11] 3,714,482
[45] Jan. 30, 1973

[54] BRUSH WEAR INHIBITOR FOR DYNAMOELECTRIC MACHINES
[75] Inventor: Melvin A. Lace, Prospect Heights, Ill.
[73] Assignee: Motorola, Inc., Franklin Park, Ill.
[22] Filed: Oct. 27, 1971
[21] Appl. No.: 192,905

Related U.S. Application Data

[63] Continuation-in-part of Ser. No. 86,792, Nov. 4, 1970, abandoned.

[52] U.S. Cl. ...................310/228, 252/51, 310/253
[51] Int. Cl. ...........................................H01r 39/56
[58] Field of Search..252/51; 310/228, 248, 250–253

[56] References Cited

UNITED STATES PATENTS

| 2,414,514 | 1/1947 | Elsey | 310/228 |
| 2,616,927 | 11/1952 | Kauck et al. | 252/51 X |
| 2,731,371 | 1/1956 | Ramadanoff | 310/228 X |
| 2,854,597 | 9/1958 | Foote et al. | 310/252 X |
| 3,227,761 | 1/1966 | De Brunner et al. | 252/51 X |

*Primary Examiner*—D. F. Duggan
*Attorney*—Foorman L. Mueller et al.

[57] ABSTRACT

The longevity of electric contact brushes for dynamoelectric machines is extended by impregnating them with a material of octadecylamine with a hydrohalogen radical which is formed into a saturated solution in a hydrocarbon solvent. The saturated solution is applied to the brush either by direct application or by vacuum impregnation. The compound of octadecylamine with a hydrohalogen radical may also be introduced to the interface of the contact brush and commutator by means of a feeder brush. The carbon contact brush or feeder brush may be dipped in acid and washed in water prior to impregnation with the compound. Additionally, the compound may be mixed in a lacquer solution and painted on the leading edge of the contact brush or feeder brush.

9 Claims, 4 Drawing Figures

PATENTED JAN 30 1973

INVENTOR.
MELVIN A. LACE

BY Mueller & Aichele

ATTORNEYS.

BRUSH WEAR INHIBITOR FOR DYNAMOELECTRIC MACHINES

CROSS REFERENCE TO RELATED APPLICATION

This application is a continuation-in-part of application Ser. No. 86,792, filed Nov. 4, 1970, now abandoned.

BACKGROUND OF THE INVENTION

This invention relates generally to electric contacts in dynamoelectric machines, and more particularly, to an improved contact brush for use in such dynamoelectric machines.

In general, dynamoelectric machines are of several types, each relatively well-known in its own particular field. For example, generator and alternator devices are used extensively in the automotive industry to produce a voltage-current output which is used to recharge the battery supply of the vehicle as well as to operate accessories and other electrical equipment during the running periods of the engine of such vehicle. There are other dynamoelectric machines, such as dynamotors, motor-generators, polyphase-motors, universal motors, and the like. In most cases, however, the dynamoelectric machines utilize slip rings on a rotating shaft to supply power to a field winding on the rotor or, in the case of a generator, to receive power from the armature winding thereof. In either case, electric current must be transferred from the slip rings on the rotating shaft to a stationary terminal which is provided for connection to suitable circuit components of a load. To accomplish this, brushes are supported in fixed relation to the frame of the dynamoelectric machine and extend to be in contact with the slip rings in such a manner as to provide an electrical transfer from the rotating slip rings to the stationary brushes. Such brushes can be made of copper, brass, carbon or graphite materials, or any combination thereof depending on the particular function of the dynamoelectric machine.

Whatever the material used to form the brushes, they will eventually wear away as a result of the constant friction between the slip ring and the end of the brush and as a result of electric erosion due to current flow. This wear may be further accelerated by vibration, as for example, in alternators of motor vehicles when such vehicles are moving over rough roads, or by engine vibration. Another cause of wear, this being particularly true in the case of dynamic breaking of DC or universal motors, is the tremendous amount of brush bounce of vibration due to the sudden stop of the armature.

SUMMARY OF THE INVENTION

Accordingly, it is an object of the present invention to increase the useful life of electrical contacts which are movable relative to each other.

Another object of the present invention is to improve the conductivity between electrical contacts movable relative to each other.

It is a further object of this invention to provide improved contact brushes for engaging the slip rings of dynamoelectric machines.

Still another object of this invention is to provide an improved contact brush for dynamoelectric machines so the brush can be used for a much longer period of time than would otherwise be the case.

Briefly, a chemical compound, preferably of octadecylamine hydrochloride, or any of the other hydrohalogen materials, has proven to be an extremely useful wear preventative when impregnated into current carrying contact brushes that are used in dynamoelectric machines. The octadecylamine hydrochloride material is applied, either to the brushes or to the slip rings or commutators, while in a saturated solution of hydrocarbon liquid. The hydrocarbon liquid is then driven off by evaporation to leave behind the desired octadecylamine hydrochloride. However, in the preferred embodiment of this invention, it is the brushes that are coated or impregnated with the above-mentioned compound. In the alternative, a separate feeder brush may be used to supply the lubricant instead of the contact brush supplying the lubricant, or in addition to the contact brush. The feeder brush may be similar to the contact brush as far as structure and treatment thereof and may be either a part of the contact brush or connected to the housing. The feeder brush may also be made of a fibrous material such as cellulose.

Each contact or feeder brush may be dipped in acid and water washed prior to impregnation with the above mentioned compound, thus increasing the amount of compound which may be impregnated in the brush; or, a solution of octadecylamine with a hydrohalogen radical in a lacquer may be painted on the leading side of each of the contact brushes of the feeder brush if it is utilized. As the brush is worn away lubricant is supplied to the contact interface.

In general, octadecylamine hydrochloride, in bulk form, is substantially nonconductive and has been used for lubricants in nonconductive areas. However, when impregnated into the surface of a contact brush, the extremely thin molecular layers or points, so to speak, of the octadecylamine hydrochloride compound provide, contrary to what would be expected, an extremely good conductive interface. The wearability of the brushes is improved substantially because of this increased conductivity, thus greatly reducing, among other things, the erosion caused by current flow at the contact interface of the brush.

BRIEF DESCRIPTION OF THE DRAWINGS

While a preferred embodiment of this invention is illustrated herein for purposes of setting forth a utility thereof, all other features and advantages of this invention will be more fully realized and understood from the following detailed description when taken in conjunction with the accompanying drawings wherein.

DESCRIPTION OF THE PREFERRED EMBODIMENT

Figure 1:
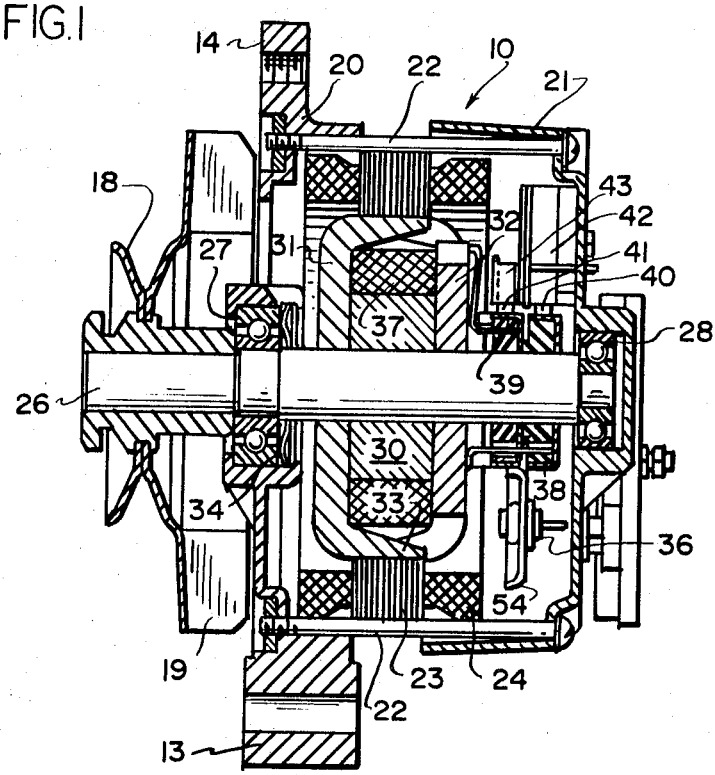
FIG. 1 is a side view of a dynamoelectric machine with a portion thereof broken away illustrating a brush support arrangement in contact with the slip rings to show the use of the improved brushes.

Referring now to the drawings, in FIG. 1 there is shown the alternator-rectifier unit 10 arranged to be supported on an automobile engine to deliver electric current for various electrical apparatus. Although the alternator 10 is illustrated herein as an exemplary form of dynamoelectric machine wherein the brushes of this invention are utilized, it is for purposes of completeness that a substantial description of the alternator is provided. The alternator has a mounting projection 13 connected to a support provided on the engine and a second projection 14 adjustably secured to a bracket which is also connected to the engine. The alternator is driven by a suitable drive belt which engages a pulley 18 which also has a plurality of fan blades 19 extending radially outwardly therefrom.

A front housing section 20 is secured to a back housing section 21 by a plurality of bolts 22 extending therebetween. Secured between these two housing sections is a laminated magnetic structure 23 forming the stator portion of the alternator about which is mounted a stator winding 24. A rotor structure includes a shaft 26 extended and supported between the two housing portions 20 and 21 by bearings 27 and 28, respectively. An annular core 30 is formed on the shaft 26 and is connected to a front pole piece 31 and a back pole piece 32 in the usual manner. Each of the pole pieces 31 and 32 has six inwardly turned pole fingers 33 which are interleaved and interspaced with respect to each other to provide the necessary variation gradient of magnetic field to provide an AC output from the stator winding 24.

The voltage output from the stator 24 is obtained by fixed terminals connected to a diode arrangement, one of which is illustrated by numeral 36. Excitation current is delivered to a rotor winding 37 through a pair of slip rings 38 and 39 circumferentially mounted on the shaft 26 and electrically insulated from one another, in a well-known manner. Electrical contact is made with the slip rings 38 and 39 by means of contact brush means 40 and 41, respectively, which are maintained in a fixed position relative to the housing of the alternator by brush holders 42 and 43, respectively. The brush holders 42 and 43 may be a single unit or separate units, as desired.

Figure 2:
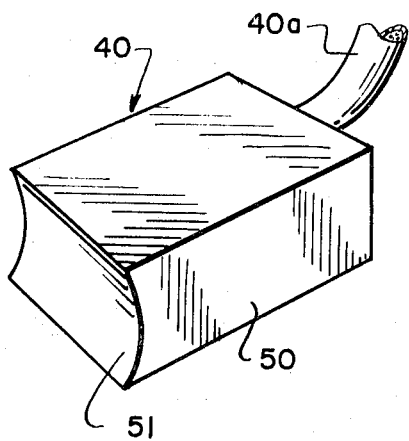
FIG. 2 is an enlarged perspective view of an electric contact brush which has been treated in accordance with the principals of this invention for use in the dynamoelectric machine of FIG. 1.

Referring now to FIG. 2, the contact brush 40 is shown in enlarged perspective view with only a portion of an electric lead 40a extending therefrom which makes electrical connection within the alternator. The contact brush 40 generally is formed of a body portion 50 which has an arcuately shaped forward face 51 engaging the slip ring. This surface 51 is achieved by a slight break-in period during which time the brush end takes the shape of the slip ring. The arcuate face 51 provides means for transferring electrical current between the brush and the slip rings over a maximum contact area to minimize electric erosion and power heating losses which would be the case if the contact area were small.

The contact brush 40, in accordance with this invention, is coated and/or impregnated with a compound of octadecylamine which includes a hydrohalogen radical in the form of HX where X is either chlorine, bromine, iodine, fluorine or astatine, the hydrohalogen radicals including hydrogen chloride, hydrogen bromide, hydrogen iodide, hydrogen fluoride and hydrogen astatide. More specifically, the compound impregnated into the brush 40 takes on the chemical formula $CH_3(CH_2)_{17}NH_2 + HX$, and specifically where the hydrohalogen is hydrochloride, the HX radical becomes $+ HCl$. While the other hydrohalogens listed above can be used with the octadecylamine to provide increased wear of the brush 40, it has been found empirically that the hydrochloride is the preferred hydrohalogen to be used.

There are several ways of coating or impregnating the brush 40 with the necessary quantity of the octadecylamine hydrochloride compound. Of these methods, two have been particularly explored for simplicity of manufacturing technique. The first method is to dissolve a quantity of octadecylamine hydrochloride in a solution of hydrocarbon, such as benzene, to an extent that the solution becomes saturated. The saturated solution is then applied to the arcuate face 51 of the brush 40 in a drop by drop sequence. That is, a drop is applied to the arcuate face 51 and then allowed to dry, i.e., the hydrocarbon is evaporated, and then a subsequent drop is applied and so on, and this procedure is followed for as many as ten times or more.

Another, more sophisticated approach, but less expensive because of the large numbers of brushes that can be impregnated, is to deposit a large number of brushes in a vat of saturated solution and then place the vat in a vacuum chamber. The chamber is then evacuated so that the solution is driven into the pores of the brush, and this procedure is repeated for as many times as is required to substantially impregnate the brush. By way of example, no further increase in weight of the brush is noticed after three such operations within a vacuum chamber, and where the vacuum is sustained for a time period of about 5 to 10 minutes each at room temperature.

The amount of octadecylamine hydrochloride which may be impregnated in a brush may be increased by first dipping the brush in an acid such as nitric acid, followed by four water washings in deionized water. In copper impregnated graphite brushes, the acid dip will dissolve the copper particles or will dissolve soluable material in the brush to open the pores for impregnating the lubricant of octadecylamine hydrochloride. The depth of the pores which are opened by the acid depends upon the amount of time the brushes are dipped in the acid.

Brushes so coated or impregnated with octadecylamine hydrochloride have been tested and amazing results observed. For example, a contact brush generally of the type used in an alternator disclosed in FIG. 1 would last for an over-the-road mileage of approximately 70,000 to 90,000 miles, this, of course, being the maximum limit of these brushes. A set of brushes impregnated with a solution of octadecylamine hydrochloride as herein described were installed in an alternator which, in turn, was installed in an over-the-road vehicle and operated for a distance of over 300,000 miles. Upon inspection after this long distance the brushes showed a sign of wear equivalent to about 40,000 miles of wear under normal circumstances without the impregnated compound. In other words, the estimated brush life could easily reach 500,000 miles or more when impregnated with the compound octadecylamine hydrochloride.

Figure 3:
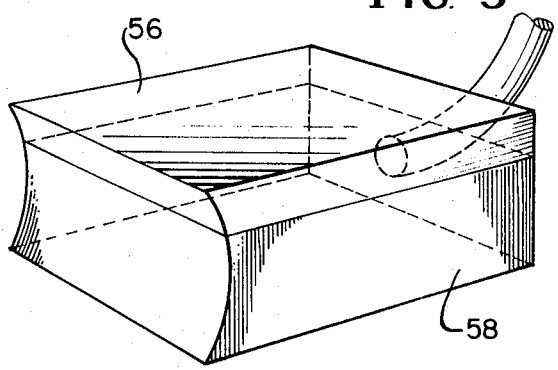
FIG. 3 is an enlarged perspective view of a contact brush with a feeder brush which has been treated in accordance with principles of this invention for use in the dynamoelectric machine of FIG. 1.
Figure 4:
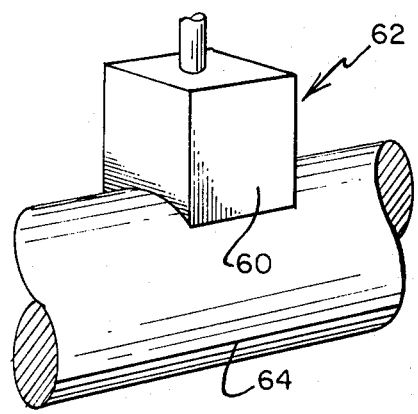
FIG. 4 is a perspective view of a portion of a dynamoelectric machine showing a brush treated in accordance with principles with this invention.

The compound of octadecylamine hydrochloride may be introduced to the interface between the commutator and brush by a "feeder" brush which may take various forms in applying the dry octadecylamine hydrochloride to the commutator. For instance the feeder brush 56 which may be attached to a contact brush such as 58 (FIG. 3), or be a separate brush supported by the alternator housing and not connected in the electrical circuit. The octadecylamine hydrochloride may be embedded in a fabric material such as a cellulose, a rayon, or some other wearing material, or it may have the structure of a contact brush, being made of graphite or some other wearable solid material used in contact brushes. The brush must, however, be capable of applying the octadecylamine hydrochloride to the commutator which then brings the octadecylamine hydrochloride in contact with the contact brushes. The "feeder" brush is especially useful in a harsh environment for assuring the constant supply of octadecylamine hydrochloride to the commutator or slip ring.

Octadecylamine hydrochloride may also be applied to contact brushes or "feeder" brushes by means of painting a mixture of the compound on the leading face 60 of the brush 62 opposing the direction of rotation of the commutator 64. As the brush wears, the octadecylamine hydrochloride is continuously applied to the commutator. The mixture painted on the brush includes the octadecylamine hydrochloride, a vehicle such as a water base lacquer which is normally in solid form, and a solvent such as water. The water base lacquer is preferred because it is a neutral vehicle, although, a vehicle of an acrylic alkilid base may be used instead. A liquid comprising approximately 5 percent water base lacquer and 95 percent water by weight may be combined with crystals of octadecylamine hydrochloride with the octadecylamine hydrochloride comprising from 10 percent to 30 percent by weight of the total mixture. The mixture is ball milled to maintain fineness and consistency for application. When the paint drys a residue of octadecylamine hydrochloride adheres to the brush providing a constant supply to the commutator as the brush is erroded.

What has been described is a simple and effective means of greatly improving the wearability of relatively movable electrical contacts and more particularly electric contact brushes used in dynamoelectric machines, and hence, thus increasing the usable life of the machine. This is a very attractive improvement for machines such as alternators for automobiles, or the like, and particularly in trucks which are required to operate substantially trouble free over long distances. Minor changes to the chemical compound, as well as other methods of impregnating or coating the brush, may be incorporated without departing from the spirit and scope of the novel concept of this invention.

I claim:

1. An electrical device including first and second electrical contacts with one of said contacts being moveable and a compound of octadecylamine with a hydrohalogen radical, said compound being between said contacts for increasing the useful life of said contacts.

2. The electrical device according to claim 1 including an applicator for applying said compound to one of said contacts.

3. The electrical device according to claim 2 wherein said applicator comprises a carbon brush impregnated with said compound.

4. The electrical device according to claim 1 wherein said hydrohalogen radical comprises a hydrohalogen radical selected from the group consisting of hydrogen chloride, hydrogen bromide, hydrogen iodide, hydrogen flouride and hydrogen astatide.

5. An electrical device according to claim 1 including a mixture for applying said compound to one of said contacts comprising said compound, a hydrohalogen radical, a lacquer and a solvent.

6. The mixture according to claim 5 wherein said hydrohalogen radical comprises hydrogen chloride, wherein said lacquer comprises a water base lacquer and wherein said solvent comprises water.

7. The electrical device according to claim 1 being of the dynamoelectric machine type wherein said first contact comprises a rotating member through which current passes; said second contact comprises a current carrying contact brush means in physical contact with said rotating member so that current passes therebetween; and wherein said compound is between said rotating member and said current carrying contact brush means for increasing the useful life of said brush.

8. The electrical device according to claim 7 wherein said contact brush means comprises a carbon brush.

9. The electrical device according to claim 7 wherein said rotating member comprises a shaft, an armature positioned on said shaft, and electrical contact means formed on said shaft through which current flows to or from said armature during the operation of said dynamoelectric machine.

* * * * *